June 14, 1949.  F. F. RIEKE  2,473,448
OSCILLATOR

Filed April 18, 1945  3 Sheets-Sheet 1

INVENTOR.
FOSTER F. RIEKE
BY
ATTORNEY

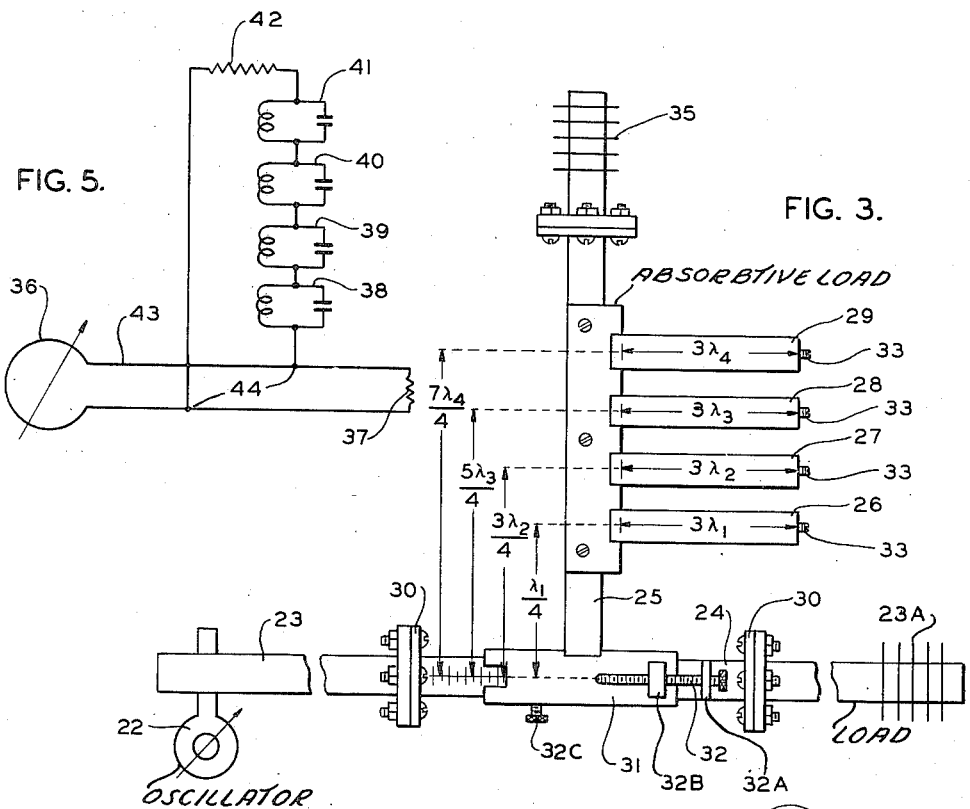
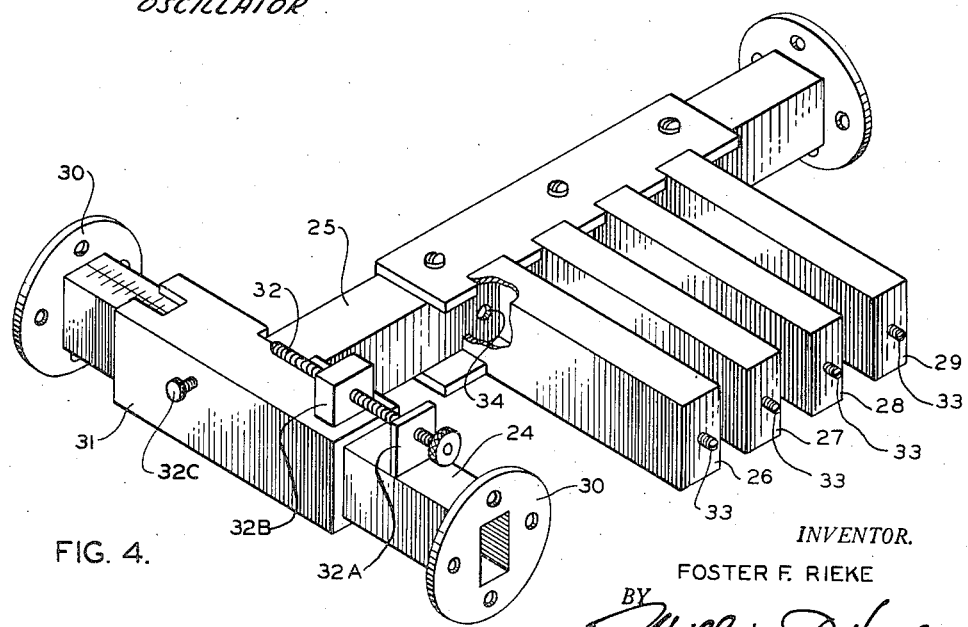

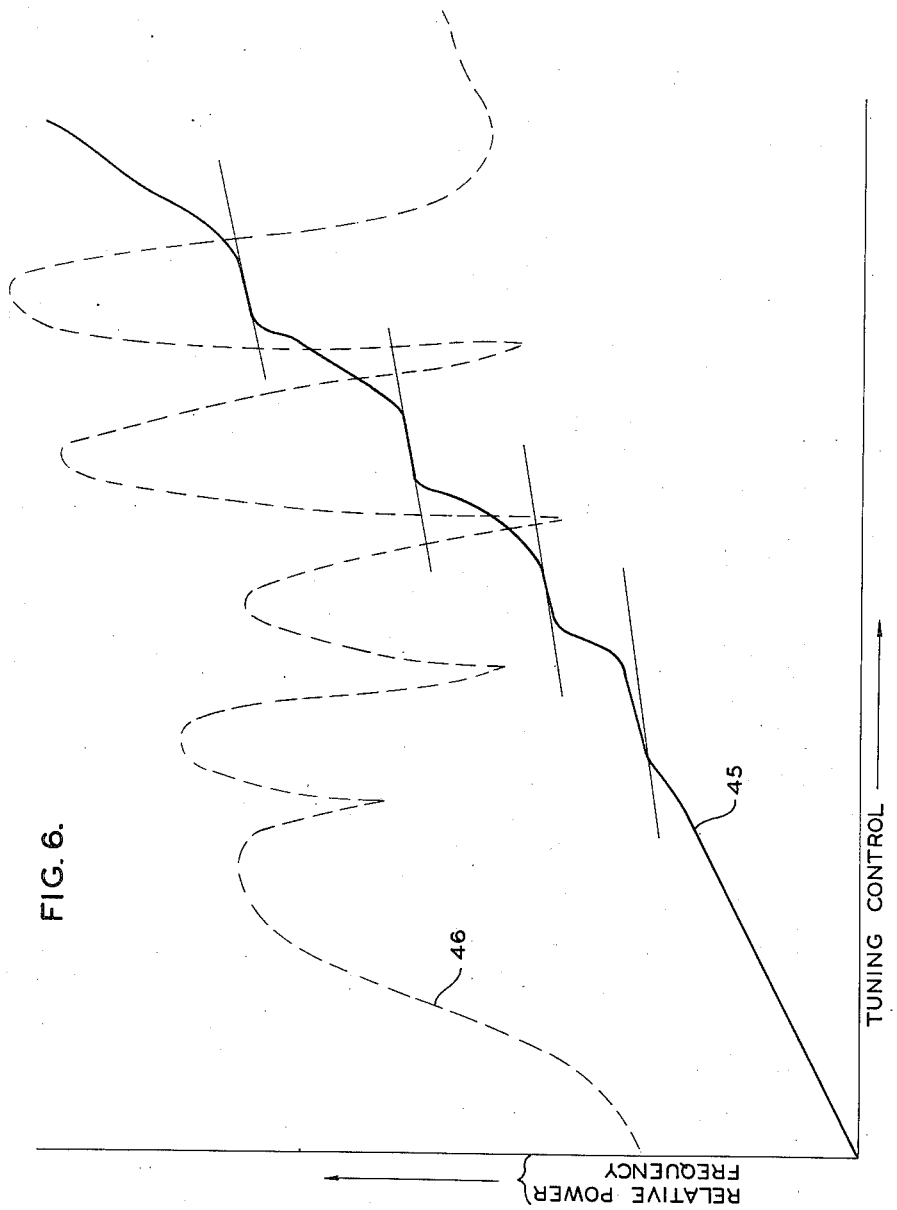

Patented June 14, 1949

2,473,448

UNITED STATES PATENT OFFICE 2,473,448

OSCILLATOR

Foster F. Rieke, Belmont, Mass., assignor, by mesne assignments, to the United States of America as represented by the Secretary of War Application April 18, 1945, Serial No. 588,988

5 Claims. (Cl. 250—36)

The present invention relates to ultra-high frequency oscillators and more particularly to apparatus for stabilizing the operating frequencies of such oscillators.

In the operation of ultra-high frequency generators, especially magnetrons, considerable difficulty is encountered in maintaining the frequency of oscillations constant. Several important factors contribute to this variance, such as variations in temperature of the oscillator, variations in supply voltages, and variation in load impedance. These variations may occur at any time during operation of the generator. Variation of load impedance is perhaps most troublesome because of the inability to control the variations. One source, for example, of such impedance variations may be fluctuations in the impedance which an antenna presents to its transmission line as it rotates. Other factors which may cause frequency variation over a period of time are aging and warping of the oscillator.

Accordingly, it is the principal object of this invention to stabilize the frequency of an ultra-high frequency generator such as a magnetron oscillator.

It is another object of the present invention to enable the stabilization of a tunable magnetron at any one of a plurality of predetermined frequencies.

In accordance with the present invention there is provided, in conjunction with a transmitting oscillator connected by a transmission line to a load such as a radiating antenna, a high-Q resonant cavity, or a plurality of such cavities, in combination with an absorptive load, the latter elements being effectively connected in a network with the line and the oscillator. For a better understanding of the invention, together with other novel features and objects thereof, reference is had to the following description to be read in connection with the accompanying drawings, wherein like reference numerals designate like parts.

In the drawings:

Fig. 1 diagrammatically illustrates a preferred embodiment of a stabilizer unit for an oscillator in accordance with the invention;

Fig. 3 shows, in elevation, a preferred embodiment of a stabilizer unit for a tunable oscillator in accordance with the invention;

Fig. 4 is an isometric view of the apparatus disclosed in Fig. 3;

Fig. 5 shows schematically an electrical equivalent of the apparatus disclosed in Figs. 3 and 4; and Fig. 6 is a diagram showing the tuning curve obtained from a tunable magnetron operating in conjunction with the stabilizer unit disclosed in Figs. 3 and 4.

Figure 1:
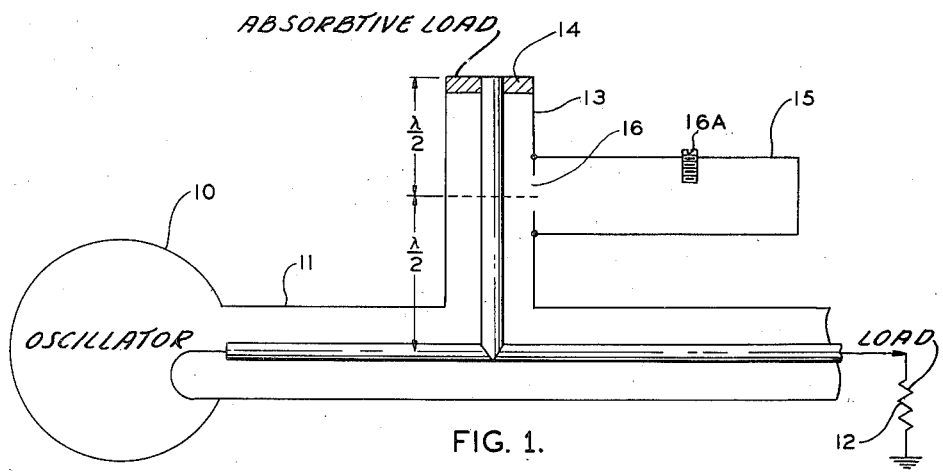

Referring now to the drawings and more particularly to Fig. 1, a stabilizer unit is shown for regulating the frequency of an oscillator 10 which is coupled by means of a coaxial line 11 to a load impedance 12. Communicating with coaxial line 11 is a stub section 13. Termination of the stub 13 is provided by an absorptive load 14. A closed hollow stub 15, preferably a section of rectangular wave guide affording a high-Q cavity, is electrically coupled into the stub 13 by means of an iris 16 or the equivalent thereof. The stub 14 is equipped with a tuning screw 16A as shown.

The coaxial stub section 13 is approximately one wavelength long while the high-Q cavity 15 is placed about one-half wavelength from the junction formed between stub 13 and line 11. An electrical equivalent circuit of the components shown in Fig. 1 is schematically presented in Fig. 2, wherein parallel-resonant tank circuit 17 represents the oscillator 10. A variable impedance 18 represents a fluctuating load, and the stub 13 and high-Q cavity 15 are represented as a series combination of a resistance 19 and a high-Q parallel-resonant tank circuit 20. The circuit 17 and the circuit 20 are separated by an electrical distance 21 which is an integral number of half wavelengths. The high-Q tank circuit 20 serves to decrease the effect of variations in output impedance 19 on the frequency of the oscillator as represented by tank circuit 17.

It has been found that the use of the load 14, Fig. 1, as the termination of stub 13 will act in such a manner as to prevent oscillation of the oscillator in undesired modes. These undesired modes of oscillation have been found to be especially prevalent in magnetron oscillators.

The above described embodiment of the invention may be equally well applied to systems in which the radio-frequency transmission line is of the wave guide type rather than coaxial line as shown, and this invention is, therefore, not limited to the use of coaxial lines. The same considerations regarding electrical distances will apply in such case.

Referring now to Figs. 3 and 4, there is shown in plan and in perspective, respectively, a stabilizer unit for regulating the operation of a tunable oscillator 22 at any one of several previously determined frequencies. The oscillator 22 may be a magnetron or other type of oscillator. The output energy of oscillator 22 is fed by means of a rectangular wave guide 23 to a load 23A. The stabilizing unit is interposed in wave guide 23 and comprises a main guide 24 and a stub guide 25 communicating with the main guide 24 and having a plurality of cavities 26, 27, 28, and 29 branching therefrom. The main guide 24 is inserted as a part of wave guide 23 and secured therein by means of flanges 30. The stub guide 25 is mounted on the broad side of a rectangular slider 31 received over the main guide 24. The slider 31 may be shifted in position by an adjusting screw 32 running through a block 32A mounted on the main guide 24 and a block 32B mounted on slider 31. Set screw 32C serves to maintain the slider 31 at the selected position. Each of cavities 26 to 29 may be tuned by means of a trimmer 33, and is coupled to the stub guide 25 by means of an iris as 34. The iris 34 is preferably circular but may be of any suitable design. An absorptive load 35 terminates the stub 25 as shown. Each of cavities 26 to 29 is positioned an odd number of quarter wavelengths from the junction of wave guides 24 and 25.

The stabilizing unit will introduce practically no power attenuation when one of these cavities is resonant to the oscillator frequency. This will be more clearly evident by referring to Fig. 5 showing the unit in equivalent schematic form, wherein the tunable oscillator 22 of Figs. 3 and 4 is represented by symbol 36, the load 23A of Figs. 3 and 4 by the resistance 37, and the cavities 26 to 29 by parallel-resonant circuits 38, 39, 40, and 41, respectively. The load 35 of Figs. 3 and 4 is represented in Fig. 5 by a resistance 42.

When the oscillator 36 is tuned to the resonant frequency of any one of the parallel-resonant circuits 38 to 41, there appears across the line 43 at the terminals 44 a parallel-resonant circuit in series with the load 42. As was pointed out in connection with the discussion of the circuit of Fig. 1, the addition of a load, such as represented by load 42, to the circuit aids greatly in the prevention of oscillation in the higher modes. The addition of the parallel-resonant circuit which is effectively in parallel with the oscillator is to stabilize the frequency of oscillation.

Referring to Fig. 6, there are shown typical frequency and relative power curves as obtained from a magnetron employed in conjunction with the above described stabilizer unit as the tuning control of the magnetron is varied. The solid line 45 represents the frequency curve as plotted against a linear movement of the tuning control while dashed line 46 represents the relative power yielded by the magnetron as the tuning control is varied. It will be evident from the humps in the relative power curve 46 that the maxima of the power output occur at the points of resonance of the stabilizer unit.

As an example of the amount of stabilization which may be accomplished by the use of this invention, it has been found that using a cavity with a Q of 6000, unloaded, and a Q of 1200, loaded, the stabilization factor was approximately five. The stabilization factor is defined as the ratio of the slope of the frequency curve without stabilization to the slope with steps. This would mean then that if without stabilization the magnetron was within five megacycles of the desired frequency, it would be corrected to within one megacycle if the stabilizer were added.

Figure 2:
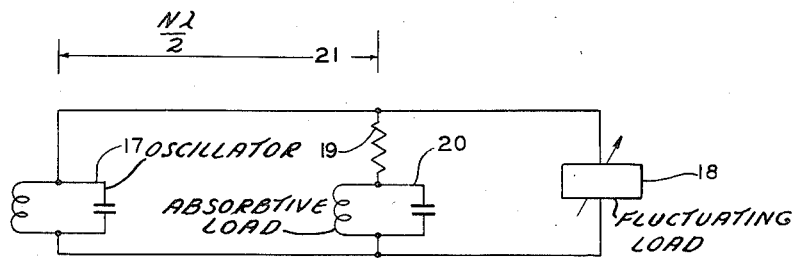
Fig. 2 shows schematically the electrical equivalent of the stabilizer unit disclosed in Fig. 1.

While there has been shown in Figs. 3 and 4 a stabilizing unit employing four resonant cavities, as many stabilized frequency steps as are desired can be obtained by adding cavities, thus providing a means for transmitting radio frequency energy at any one of several frequencies with little power loss and without the need for critical adjustments. The wave guide cavities are not necessarily required to be of the configuration illustrated herein, so long as they afford the desired frequency selection. It should also be understood that the equivalent circuit diagrams shown in Figs. 2 and 5 are for explanatory purposes only and are not intended to restrict the principle of operation of the invention.

The foregoing description has disclosed preferred embodiments of the invention, but it will be obvious that many changes and modifications may be made therein without departing from the spirit and scope of the invention.

What is claimed is:

1. In combination with a magnetron oscillator and an associated output wave guide therefor, a frequency stabilizer unit comprising a main wave guide adapted for insertion in said output wave guide, a stub wave guide branching from said main guide, and means affording a plurality of rectangular wave guide cavities respectively communicating with said stub guide through suitable irises therein, each of said cavities being an integral number of wavelengths long and being disposed an odd number of quarter wavelengths from the junction of said stub guide with said main guide.

2. The combination set forth in claim 1, including means for adjusting the position of said stub guide lengthwise of said main guide.

3. The combination set forth in claim 1, including a body of absorptive material terminating said stub guide.

4. The combination set forth in claim 1, including means for tuning each of said cavities.

5. In combination with an ultra-high frequency oscillator and a transmission line connecting the oscillator to a load, a stub branching from said transmission line, a body of absorptive material terminating said stub, and means affording a wave guide cavity communicating with said stub through a suitable iris therein, said cavity being resonant at a predetermined frequency of oscillations within the operating range of said oscillator.

FOSTER F. RIEKE.

REFERENCES CITED

The following references are of record in the file of this patent:

UNITED STATES PATENTS

| Number | Name | Date |
| --- | --- | --- |
| 1,986,623 | Conklin | Jan. 1, 1935 |
| 2,088,461 | Briggs | July 27, 1937 |
| 2,238,438 | Alford | Apr. 15, 1941 |
| 2,321,521 | Salinger | June 8, 1943 |

OTHER REFERENCES

Radio, July 1944, pp. 22 to 26 and p. 74.